Figure 1:
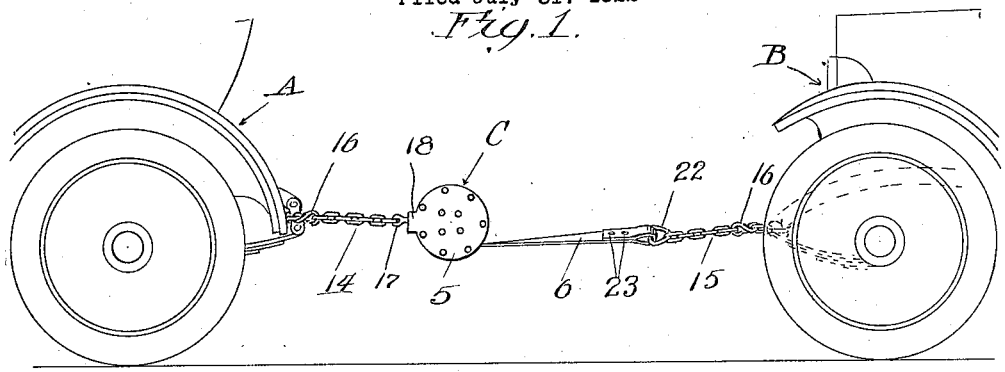

Nov. 6, 1923.                    R. R. COWLES                    1,473,211
                              VEHICLE TOWING DEVICE
                                Filed July 31, 1922

Inventor:
Rolla R. Cowles,
by Charles Shervey
his Atty.

Patented Nov. 6, 1923.

1,473,211

UNITED STATES PATENT OFFICE.

ROLLA R. COWLES, OF CHICAGO, ILLINOIS.

VEHICLE TOWING DEVICE.

Application filed July 31, 1922. Serial No. 578,571.

*To all whom it may concern:*

Be it known that I, ROLLA R. COWLES, a citizen of the United States, and a resident of Chicago, Cook County, and State of Illinois, have invented certain new and useful Improvements in Vehicle Towing Devices, of which the following is declared to be a full, clear, and exact description.

This invention relates to vehicle towing devices and its principal object is to provide a towing device of improved and novel construction, capable of being readily attached to the vehicles, and having a flexible, elastic strip or band forming part of the device, and a spool or reel having a non-revoluble core upon which the strip or band is coiled or wound. Another object is to provide a towing device in which the band or strip may be partially withdrawn from the spool to enable the towed vehicle to remain a short distance behind the towing wheel, the strip itself having inherent properties which cause it to coil itself upon the spool, and thereby take up any slack in the line, whenever the pulling strain on the band is discontinued. Another object is to provide a towing device which is flexible and resilient whereby sudden jars and jerks upon both the towed vehicle and the one towing it may be reduced to a minimum. Another object is to provide means for taking up slack in the tow line. Another object is to provide a towing device with means whereby the tow line may be kept free from the ground whenever the distance decreases between the towed vehicle and the one towing it. With these and other objects and advantages in view, this invention consists in the several novel features hereinafter fully set forth and claimed.

Figure 2:
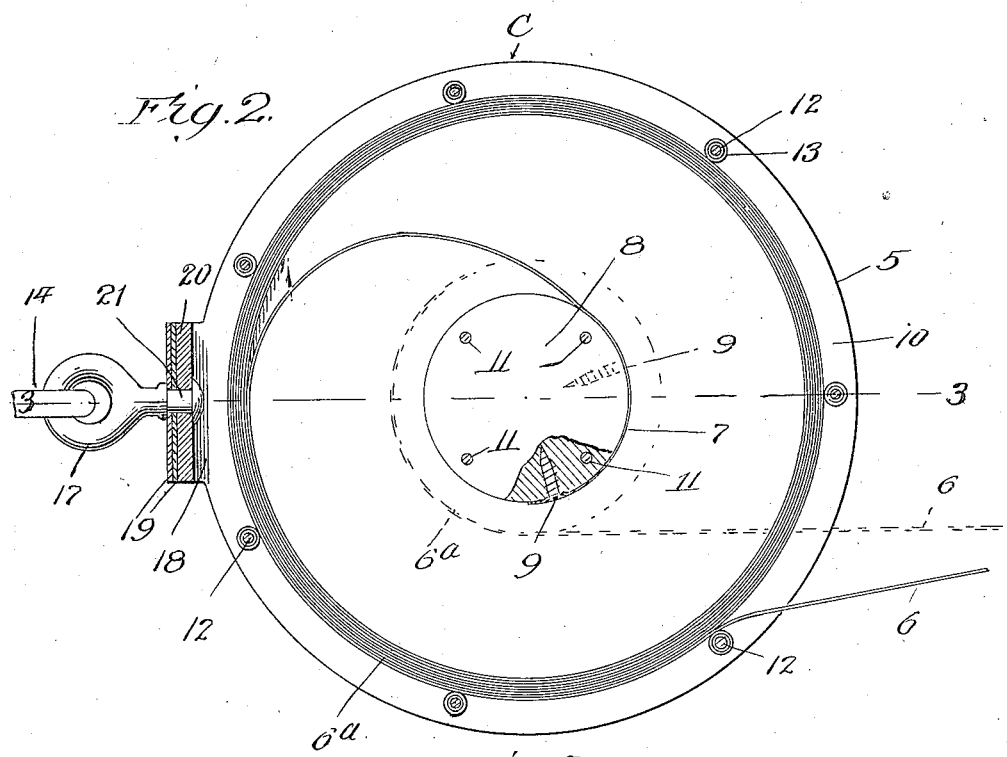
Figure 3:
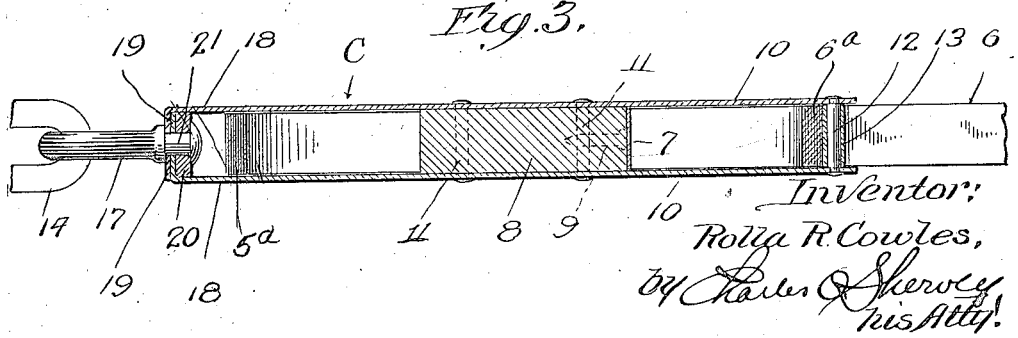

The invention is clearly illustrated in the drawing accompanying the specification, in which:

Fig. 1 is a side elevation of a vehicle towing device embodying a simple form of the present invention and showing the same in position connecting two vehicles; Fig. 2 is a view, partly in side elevation and partly in vertical, longitudinal section of the spool and band or strip, and Fig. 3 is a horizontal cross-section taken on the line 3—3 of Fig. 2.

Referring to said drawing, the reference character A designates a vehicle, such as an automobile or other motor vehicle, wagon, truck, or the like, and B designates a disabled vehicle connected to the vehicle A by the towing device C which contains a simple embodiment of the present invention.

In its preferred form, the towing device comprises a spool 5 upon which is coiled or wound a flexible, elastic band or metal strip 6, one end 7 of which is positively secured to the core or body portion 8 of the spool by screws or like fastening devices 9. The core 8 is non-revoluble and is in the form of a cylindrical block, and to said core are secured two side members 10, which, if desired, may comprise flat disks, and the core and disks may be rigidly secured together by rivets or other like fastening members 11. As a preference, the marginal portions of the side members 10 are secured together by spacers 12 which may comprise pins that extend between the side members and have reduced end portions that extend through the side members and are headed down upon the outer faces thereof. If desired, anti-friction rollers 13 may be placed around the spacers 12, although these anti-friction rollers may be dispensed with if desired. The spacers 12 also act to confine the coil 6ª of the band on the spool.

Secured to the spool 5 and to the free end of the band or strip 6 are connecting devices 14, 15, constructed and arranged for connection with convenient parts of the vehicles. In the form of the invention shown, the connecting devices comprise chains having hooks 16 upon their free ends which may be hooked into or around links of the chains to form loops. The chain 14 is secured to the spool 5 by an eye bolt 17 and, for convenience and economy in construction, the side members 10 of the spool are formed with ears 18 that terminate in flanges 19 which overlap each other and are reinforced by a block 20 through which the neck or stem 21 of the eye bolt extends. The eye bolt may be secured to the spool by heading it behind the block or by a nut, if so desired. The chain 15 is secured to the end of the band or strip 6 by a D link 22, the end of the band being looped around the D link and fastened thereon by rivets 23. The flexible, elastic band or strip 6 is preferably made of spring steel, normally straight, so that when it is coiled or wound around the non-revoluble core of the spool, it tends to straighten out, whereby when it is free, or when any pulling strain on its free end ceases, the coil tends to expand, and when tightly wound, it expands from the position shown by the dotted lines in Fig. 2 to that shown in full lines in said figure, thereby drawing into the space between the side members of the spool the part of the band which has been paid out.

In use, chain 14 is secured to one of the vehicles and the chain 15 secured to the other one, and this may be done by passing one chain around the rear spring shackle of one vehicle and passing the other chain around the front spring shackle of the other vehicle or around the axles, and hooking the hooks upon their chains. When the vehicle which does the towing, commences to move forward, the band or strip commences to pay out of the spool, and at the same time contracts the coil 6ª upon the core or body 8 of the spool. During the final act of tightening the coil upon the core, the inertia of the other vehicle is overcome, so that by the time the coil is wrapped tightly around the core, the towed vehicle is started without any jerks. However, if the towing vehicle is moved rapidly, or if the vehicle to be towed is fast in the mud, it may not be started until the coil 6ª is tightly wrapped around the core. When the vehicles are both in motion, the band is maintained in a taut condition and in case the speed of the towing vehicle is reduced below that of the towed vehicle, as for instance when the towing vehicle slacks up or comes to a stop, the coil 6 unwraps or unfolds from the core, thereby taking up any slack in the line and thereby preventing the spool from dragging upon the ground.

The device takes up very little room, and may be conveniently carried in the place usually provided for containing tools or tires, as for instance, under the seats of the vehicle. It is readily attached to the vehicles and is very efficient in operation. It is simple, and requires no separate spring or springs for coiling the band or strip upon the spool, and taking up slack. The spring strip serves as the tow line, and is connected to one of the vehicles, and acts automatically to re-wind itself on the core of the spool, when released, after having been partially withdrawn from the spool. By the term "elastic" is meant that property of normally straight spring steel strips which causes them to resume their normal shape after being coiled or wound up.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. A vehicle towing device comprising a spool, a normally straight, elastic, metal strip having its major portion loosely coiled around a non-revoluble core portion of said spool, its inner end being positively secured to said core and its outer free end leading out from the spool, and connecting means, one secured to said spool, and one to the free end of said strip.

2. A vehicle towing device comprising a spool having a central non-revoluble core, side members secured thereto, and spacers circumferentially arranged about said side members and extending therebetween and secured thereto, a normally straight, elastic, metal strip having an expansible, coiled portion between the said core and spacers, its inner end being positively secured to said core, and connecting means, one secured to said spool and one to the free end of said strip.

3. A vehicle towing device comprising a spool, a normally straight, elastic, metal strip having an expansible coiled portion around a non-revoluble core portion of said spool, the inner end of which is secured to the non-revoluble core portion of said spool and its outer free end leading out from said spool, and connecting chains, one secured to said spool and one secured to the free end of said strip.

4. A vehicle towing device comprising a spool having a central core, two disk like side members, secured thereto, and circumferentially arranged spacers extending between and secured to said side members, a normally straight, elastic, metal strip having an expansible coiled portion confined between said core and said spacers, its inner end being secured to said core, and connecting members, one secured to said spool and one secured to the free end of said strip.

5. A vehicle towing device comprising a spool having two side members, each formed with a radially projecting ear terminating in a transverse flange, the one over lapping the other, and a reinforcement block behind said flanges, an eye bolt secured to said flanges and reinforcement block, a normally straight, elastic, metal strip having an expansive, coiled portion, the inner end of which is secured to said spool, and a connecting member secured upon the outer end of said strip.

6. A vehicle towing device comprising a spool, a normally straight, elastic, metal strip having a coiled portion, the inner end of which is secured to a non-revoluble part of said spool, chains, one secured to said spool and one to the free end of said strip, each chain having hooks upon its ends.

7. In a vehicle towing device, two side members, a central core secured thereto, circumferentially arranged spacing pins secured to and connecting said side members, antifriction rollers upon said pins, a normally straight, elastic, metal strip having a coiled portion between said core and antifrictional rollers, its inner end being secured to said core, and connecting members, one secured to the spool, and one to the outer end of the strip.

ROLLA R. COWLES.